United States Patent [19]

Nogami et al.

[11] 3,956,228

[45] May 11, 1976

[54] POLYESTER RESIN COMPOSITION FOR POWDER COATINGS PREPARED FROM ENDOMETHYLENETETRAHYDROPHTHALIC ACID

[75] Inventors: Sumitaka Nogami, Nobeoka; Kazuo Toyomoto, Fuji; Katsuyuki Nakamura, Nobeoka; Keiichi Waki, Nobeoka; Tooru Okada, Nobeoka; Izumi Fujita, Nobeoka; Masayuki Nanpo, Nobeoka; Shougi Misawa, Nobeoka; Chikako Nagano, Tokyo, all of Japan

[73] Assignee: Asahi Kasei Kogyo Kabushiki Kaisha, Osaka, Japan

[22] Filed: May 20, 1974

[21] Appl. No.: 471,656

[30] Foreign Application Priority Data
May 21, 1973 Japan............................ 48-55533

[52] U.S. Cl.................. 260/40 R; 260/32.8 R; 260/33.6 R; 260/33.8 R; 260/45.7 R; 260/47 C; 260/47 UA; 260/75 UA; 260/75 R

[51] Int. Cl.$^2$.................. C08G 63/52; C08G 63/54
[58] Field of Search 260/47 C, 75 UA, 47 UA;40 R, 260/45.7, 75 A

[56] References Cited
UNITED STATES PATENTS
3,759,854  9/1973  Chang et al............................ 260/21

Primary Examiner—Lester L. Lee
Attorney, Agent, or Firm—Armstrong, Nikaido & Wegner

[57] ABSTRACT

A polyester obtained from dibasic acids mixture containing 10 to 50 mole-% of endomethylene-tetrahydrophthalic acid and glycols is used in a resin composition for powder coatings. This composition has a good storage stability and when heated in the air at 150° to 220°C exhibits favorable fluidity to form an even coating which quickly hardens to a film with excellent characteristics.

24 Claims, No Drawings

3,956,228

POLYESTER RESIN COMPOSITION FOR POWDER COATINGS PREPARED FROM ENDOMETHYLENETETRAHYDROPHTHALIC ACID

This invention relates to a resin composition for powder coatings. More particularly, the invention relates to a resin composition for powder coatings, comprising a polyester obtained from a dibasic acid mixture containing endomethylenetetrahydrophthalic acid and a glycol.

Because of its excellent electrical characteristics and thermal resistance as well as its favorable weather resistance, the polyester-based resin composition for powder coatings is believed to be of great promise and currently being in a stage of vigorous development in many business enterprises.

For such a purpose, there have been known polyesters of both the thermoplastic type and the thermosetting type. The thermoplastic type has an advantage of desirable fluidity to produce a smooth, glossy coating film, whereas it as disadvantages of inferior mechanical strengths, chemical resistance, and solvent resistance.

On the other hand, the thermosetting type, such as a melanine alkyd resin in the form of solid at room temperature, an alkyd resin in combination with a blocked polyisocyanate crosslinking agent, or an unsaturated polyester resin, is expected to promise a better prospect for the reasons that being low in early-stage molecular weight, and hence, in melt viscosity, it shows a favorable fluidity to form an even coating and gives a hardned coating film excellent in mechanical strengths, chemical resistance, and solvent resistance.

However, when a so-called condensation-setting resin such as a melamine-alkyd resin or a blocked polyisocyanate-alkyd resin is used in powder coatings, the condensation reaction products formed during hardening are released through the coated surface and tend to cause coating defects such as sinking, cissing, pinholes, and the like. There is also a type of compositon in developmental stage, comprising as the main constituent a solid unsaturated polyester which is hardened by radical polymerization. Such a technique utilizes, in principle, the same reaction as has been known in the case of FRP resins where unsaturated polyesters are hardened by use of styrene. However, in order that an unsaturated polyester can be used in powder coatings, there is required a vinyl monomer, allyl monomer, or prepolymer which is solied at room temperature. Moreover, because of difficulty in keeping a balance between hardening rate and fluidity of the coating film, it has been considered very difficult to obtain a good coating film.

The present inventors conducted many experiments to develop a novel resin composition for powder coatings having none of the aforesaid disadvantages, and as a result found that after having been coated on a substrate material, a powdered polyester obtained by use of a dibasic acid mixture containing endomethylenetetrahydrophthalic acid shows, in the air at a high temperature, a favorable fluidity, forming a smooth and uniform film and, at the same time, a favorable hardenability resulting in a dry coating film with excellent physical properties. Based on this finding, the present invention has been accomplished.

An object of this invention is to provide a novel resin composition for powder coatings, comprising a polyester obtained from a dibasic acid component containing endomethylenetetrahydrophthalic acid and a glycol component.

Another object of this invention is to provide a novel resin composition for powder coatings having a favorable storage stability and a favorable fluidity at elevated temperatures to form an even coating, which composition comprises a polyester which is solid at room temperature, an additive, and a pigment.

A further object of this invention is to provide a resin composition for powder coatings, which quickly hardens on simple heating in the air, yielding a dry coating with excellent film characteristics.

Other objects and advantages of this invention will become apparent from the following description.

It has already been known that endomethylenetetrahydrophthalic acid may be used in a polyester as one of the constituents of the dibasic acid component and yields an alkyd resin which is improved in water resistance, alkali resistance, and drying characteristics [U.S. Pat. No. 2,404,836 (1946)].

It has also been known that an unsaturated polyester obtained from a polyalkylene glycol and fumaric acid and modified with dicyclopentadiene hardens by the action of heat only, yielding a hard, adherent, and flexible coating film (Japanese Patent Publication No.17,198/64). In this example, no mention is made about endomethylenetetrahydrophthalic acid, but it is presumable that fumaric acid is partly converted to said acid during the reaction.

Further, it has also been known that a composition comprising a peroxide and an alkyd resin prepared by use of endomethylenetetrahydrophthalic acid as the dibasic acid component shows hardenability (Japanese Patent Publication No. 20,435/64).

However, it has never been known that, as is the case with this invention, a polyester obtained from a dibasic acid component containing endomethylenetetrahydrophthalic acid as one of the constituents and a glycol component hardens rapidly on simple heating in the air, yielding a hard coating film with excellent characteristics; and, of course, no attempt has ever been made to prepare by use of said polyester a resin composition which is solid at room temperature and suitable for use in powder coatings.

On the basis of the above-said facts, the present inventors concentrated their efforts to turn out the said polyester into a resin suitable for use in powder coatings and, as a result, found that a polyester, which is solid at room temperature, obtained from a dibasic acid component containing 10 to 50 mole-% of endomethylenetetrahydrophthalic acid and a glycol component can be compounded with additives and pigments to form a resin composition suitable for use in powder coatings excellent in various characteristics, that is, hardening characteristics, storage stability of the coating powder, and melt flow and levelling characteristics at elevated temperatures.

According to this invention, it is essential that 10 to 50 mole-% of the dibasic acid component be endomethylenetetrahydrophthalic acid in preparing the polyester by the conventional procedure from dibasic acids and glycols. If the said content is below 10 mole-%, an advantage of this invention, that is, rapid hardening by simple heating in the air to form a dry coating film with excellent characteristics, is not fully manifested, while the content exceeding 50 mole-% is undesirable because of the disadvantage which will be revealed, for example, in discoloration of the hardened coating film. It is to be understood that the term "endomethylenetetrahydrophthalic acid" as used herein means not only the free acid but also derivatives thereof having esterifying ability, such as anhydride thereof and ester derivatives, which can also be used in this invention with similar results.

The dibasic acids to be used in combination with endomethylenetetrahydrophthalic acid are aromatic dibasic acids such as terephthalic acid, isophthalic acid, phthalic anhydride, 1,5- and 2,6-naphthalenedicarboxylic acids, p,p'-diphenyldicarboxylic acid, p,p'-bis(carboxyphenoxy)ethane, p,p'-methylenedibenzoic acid, p,p'-ethylenedibenzoic acid, and the like, and aliphatic dibasic acids such as maleic anhydride, fumaric acid, and other unsaturated dibasic acids, succinic acid, adipic acid, azelaic acid, sebacic acid, and the like. Of these, particularly preferred are terephthalic acid, isophthalic acid, phthalic anhydride, maleic anhydride, fumalic acid, adipic acid and sebacic acid. Since those derivatives of the dibasic acids which have esterifying ability can also be used, the term "dibasic acids" as used herein means not only dibasic acids themselves, but also such derivatives thereof.

The glycols to be used are ethylene glycol, propylene glycol, 1,4-butanediol, 1,4-cyclohexanediol, 1,4-cyclohexanedimethanol, hydrogenated Bisphenol-A, propylene glycol-Bisphenol-A adduct [2,2-bis(4-hydroxypropoxyphenyl)propane], ethylene glycol-Bisphenol-A adduct [2,2-bis(4-hydroxyethoxyphenyl)propane], neopentyl glycol, and the like. These glycols are used each alone or in combinations. The molar ratio of total dibasic acids to glycols is 0.9 to 1.3, preferably 1.0 to 1.2. The combination of endomethylenetetrahydrophthalic acid, other dibasic acids, and glycols is preferably such that the resulting polyester may have a softening point of 40° to 180°C. Such a combination may easily be selected by referring to the conventional technique of polyester syntheses.

Examples of the preferable combinations are as follows:
1. EMTPA-TPA-FA-EG
2. EMTPA-TPA-EG; 2') EMTPA-TPA-IPA-EG-PG
3. EMTPA-FA-EG
4. EMTPA-TPA-FA-EG-PG
5. EMTPA-TPA-EG-PG
6. EMTPA-FA-TPA-NPG-EG
7. EMTPA-TPA-EG-PGBA
8. NDC-EMTPA-EG-PG
9. EMTPA-BCEA-EG-PG
10. DPDC-EMTPA-EG-hydrogenated BA Note:
EMTPA: Endomethylenetetrahydrophalic acid (and derivatives)
TPA : Terephthalic acid (and derivatives)
FA : Fumaric acid (and derivatives)
IPA : Isophthalic acid (and derivatives)
NDC : Naphthalene-1,5- or -2,6-dicarboxylic acid (and derivatives)
BCEA : Bis-p,p'-carboxyphenoxyethane (and derivatives)
DPDC : p,p'-Diphenylethanedicarboxylic acid (and derivatives)
EG : Ethylene glycol
PG : Propylene glycol
NPG : Neopentyl glycol
PGBA : Propylene glycol-Bisphenol-A adduct
Hydrogenated BA: Hydrogenated Bisphenol-A In order that the advantages of this invention become more evident, it is desirable to use as one of the constituents of the dibasic acid component an aromatic dicarboxylic acid (or a derivative thereof) having the substituent groups on the aromatic nucleus at para positions to each other, particularly in the form of bishydroxyethyl ester or an equivalent thereof (preferably, 30 to 100 mol-% of the aromatic dicarboxylic acid (or a derivative thereof) having the substituent groups on the aromatic nucleus at para positions to each other is in the form of bishydroxyethyl ester or an equivalent thereof).The term "equivalent of bishydroxyethyl ester" as used herein means a lower polymer thereof having a polymerization degree of 20 or lower.

The above-said aromatic dibasic acid (or derivatives) content of the dibasic acid component is desirably 50 mole-% or more in view of storage stability of the product powder coating, but 78 mole-% or less in view of fluidity of the coating film while being baked.

It is desirable in this invention to use ethylene glycol as one of the constituents of the glycol (diol) component in combination with the aromatic dibasic acid having the substituent groups on the aromatic nucleus at para positions to each other, a desirable proportion of the ethylene glycol being 30 to 100 mole-% of the chemical equivalent of said dibasic acid. Consequently, in a desirable polyester, the above-noted aromatic dibasic acid having substituent groups at para positions accupies 50 to 78 mole-% of the dibasic acid component and 30 to 100 mole-% of said dibasic acid are bound to one another through ethylene diester linkages. Viscosity of the powder coatings decreases critically at a baking temperature in the range from 150° to 220°C, yielding a dry coating film with excellent surface appearance.

The polyester resin of this invention can be conveniently prepared by heating a reactant mixture at a temperature from 100° to 220°C with stirring under a stream of an inert gas while removing the water or alcohol formed during the esterification reaction. It is desirable to use as a starting material a lower alcohol ester of the dibasic acid which is allowed to react with a glycol in the presence of an ester-exchange catalyst to undergo ester-exchange reaction. After removal of the lower alcohol formed, to the reaction mixture are added another dibasic acid, if it is to be jointly used, and a glycol, if necessary. The mixture is allowed to react while removing the water formed. It is also possible to add further a polycondensation catalyst and, toward the end of the reaction, to apply a vacuum, 10 to $10^{-3}$ mm Hg, to remove the glycol, thus resulting in increase of molecular weight of the polyester.

The number-average molecular weight of the polyester thus obtained is desirably 500 to 8,000, particularly 2,000 to 7,000 in view of physical properties and evenness of the hardened coating film. In so far as the advantages of this invention are not lost, a part of the dibasic acid component or of the diol component can be replaced by monocarboxylic acid or monohydric alcohol, respectively, or alternatively by polyfunctional constituents such as tricarboxylic acid or triol, respectively.

The polyester resin thus obtained is preliminarily crushed after cooling and stored.

The pigments to be used in this invention are those inorganic and organic types among pigments generally used in coating materials which are usable in powder coatings and include, for example, titanium dioxide, zinc oxide, iron oxide, Isoindolinone Red, Isoindolinone Orange and the like. The amount of the pigments to be added can be varied as occasion demands, but is desirably 0.1 to 50 % by weight of the present composition for powder coatings The term "additives" as used herein means those additives which are necessary in preparing powder coatings. Depending upon the resin composition and intended use of the powder coating, additives such as flow agents, color stabilizers, fluorescent whitening agents, etc., are used. The additives can be used in combinations and the proper amount to be added is each 0.01 to 5 % by weight based on the total weight of the composition.

Further, in so far as the advantages of this invention are not lost, other resins, catalysts, etc., may be added.

The present resin composition for powder coatings is prepared by mixing the aforesaid polyester resins, pigments, additives, etc. The mixing can be effected by (A) as in the case of solution type paints, dispersing resins, pigments, and additives in a solvent, such as toluene, xylene, methyl ethyl ketone, acetone, chloroform, and the like, subjecting the mixture to further dispersion with a dispersion apparatus, such as sandmill, to complete the dispersion and then drying it to spheroidal perticles with a spraying dryer system, (B) dispersing the components as in the case of (A), adding the resulting dispersion into a poor solvent, such as methanol, ethanol, petoroleum benzine, and the like, stirring the mixture to isolate the components and then drying the isolated components, or (C) dispersing the molten components by milling. The mixture is ground and the portion passed through 100 to 300-mesh screen is collected. The particle size can be suitably selected depending upon the coating procedure.

The application of the powder coatings to a substrate material can be effected by known coating procedures such as, for example, fluidized bed coating, electrostatic powder coating, etc. The applied coating film is heated in the air at a temperature of 150° to 220°C, preferably 170° to 210°C, for 10 to 40 minutes to obtain dry coating film which is smooth, glossy, highly hardened, and flexible.

The invention is illustrated below with reference to Example, but the invention is not limited to the Example.

EXAMPLE 1
Preparation of polyester resins

Into a 500-ml flask provided with a reflux condenser, stirrer, nitrogen inlet, and a tube connected to a vacuum unit, were charged starting materials in the proportions given in Table 1. The reaction was conducted in the following manner.

In the presence of an ester-exchange catalyst, dimethyl ester of a saturated acid was allowed to react with an equivalent amount of ethylene glycol at 215°C for 4 hours to synthesize a corresponding bishydroxyethyl ester by ester-exchange reaction. Then, endomethylenetetrahydrophthalic acid, other dibasic acid or dimethyl ester thereof, and a glycol were added to the reaction mixture and the reaction was allowed to continue under a stream of nitrogen, at 180° to 200°C under atmospheric pressure, until a conversion of 95 % was attained. Then, a polycondensation catalyst was added to continue the reaction for further 5 to 6 hours under a reduced pressure of 0.01 to 1.0 mm Hg. When the melt viscosity at 200°C reached 10 to 30 poises, the reaction was discontinued and the reaction mixture was quenched. Properties of the resulting resins were as shown in Table 1.

Table 1

| | Preparation of polyester resin | | | | | | | | |
|---|---|---|---|---|---|---|---|---|---|
| | Composition of charge | | | | | | Polyester resin formed | | |
| Resin No. | Endomethylenetetrahydrophthalic anhydride (mole) | Fumaric acid (mole) | Saturated acid (mole) | Glycol (mole) | | Ester-exchange catalyst (weight %) | Polycondensation catalyst (weight %) | Acid value | Molecular weight | Softening temperature (°C) |
| 1 | 1.0 | 0 | TPA 1.25 | EG 2.5 | PG 0 | Ca(OAc)₂ 0.05 | Sb₂O₃ 0.03 | 0.3 | 5100 | 54–56 |
| 2 | 0.5 | 0.5 | 1.25 | 1.25 | 1.25 | Mn(OAc)₂ 0.03 | " | 0.2 | 5700 | 52–54 |
| 3 | 0.75 | 0.25 | 1.25 | 2.5 | 0 | " | " | 0.4 | 4800 | 55–57 |
| 4 | 0.25 | 0.8 | 1.25 | 2.0 | 0.5 | " | " | 0.8 | 5500 | 53–56 |
| 5 | 1.6 | 0 | 2.4 | 4.4 | 0 | " | " | 0.6 | 3800 | 54–56 |
| 6 | 0.5 | 0.25 | 1.6 | 3.2 | 0 | -- | " | 1.8 | 5000 | 48–52 |
| 7 | 1.0 | 0 | DPDC 1.25 | 2.0 | 0.5 | Ca(OAc)₂ 0.05 | " | 1.5 | 7200 | 56–58 |
| 8 | 0.5 | 0.5 | NDC 1.25 | EG 1.25 | PG 1.25 | Ca(OAc)₂ 0.05 | Sb₂O₃ 0.03 | 0.4 | 6800 | 58–62 |
| 9 | 1.0 | 0 | 1.25 | Hydrogenated BA 1.25 | EG 1.25 | " | " | 1.8 | 2800 | 75–80 |
| 10 | 0.5 | 0.5 | 1.25 | TPA PGBA 1.25 | 1.25 | " | " | 1.4 | 2500 | 58–60 |
| 11 | 0.5 | 0.5 | 3.0 | EG 6.0 | NPG 0.6 | " | " | 0.5 | 6000 | 60–62 |

Note:
TPA: Dimethyl terephthalate
IPA: Isophthalic acid
DPDC: Dimethyl p,p'-diphenylethanedicarboxylate
NDC: Dimethyl naphthalene-1,5-dicarboxylate
EG: Ethylene glycol
PG: Propylene glycol
NPG: Neopentyl glycol
Hydrogenated BA: Hydrogenated Bisphenol-A
PGBA: Propylene glycol-Bisphenol-A adduct
Ca(OAc)₂: Calcium acetate
Mn(OAc)₂: Manganese acetate
Sb₂O₃: Antimony trioxide

Preparation of powder coatings

To 100 parts by weight of the polyester resin obtained as mentioned above and crushed to the size of an Indian bean, were added 33 parts by weight of a rutile-type titanium oxide (R-820, produced by Ishihara Sangyo Co.), 0.15 part of Noclac 200 (produced by Ouchi Shinko Co.), and 1.5 parts by weight of a flow agent. The mixture was milled for 10 minutes by means of PLASTI CORDER (made by Brabender Co., FR Germany) at a cell temperature of 80°C and at 130 rpm. The milled mixture was cooled and ground to collect the portion passed through a 150-mesh screen.

Coating experiment

The powder coating obtained above was applied by means of an electrostatic coater (model 321, made by RANS BARG Co.) to a thickness of 70 to 90 $\mu$. The coated specimen was baked in a hot-air drying oven at 190°C for 30 minutes. Characteristics of the baked coated specimen were as shown in Table 2.

Table 2

| Example 1, resin No. | 1 | 3 | 4 | 5 | 6 | 7 | 8 | 9 | 10 | 11 |
|---|---|---|---|---|---|---|---|---|---|---|
| Gloss, 60° specular reflectance | 96 | 97 | 95 | 98 | 96 | 98 | 96 | 94 | 95 | 96 |
| Flatness, visual inspection | Good | " | " | " | " | " | " | " | " | " |
| Adhesiveness, crosshached test | 100/100 | " | " | " | " | " | " | " | " | " |
| Erichsen (mm) | 9.2 | 9.1 | 8.9 | 9.0 | 9.1 | 8.7 | 8.9 | 7.7 | 7.5 | 9.2 |
| Bending test, 2 mm $\phi$ | OK | OK | OK | OK | OK | OK | OK | $\phi$ 4 mm OK | OK | OK |
| Impact strength, ½' × 500 g (cm) | 50 | 40 | 45 | 48 | 47 | 50 | 51 | 43 | 42 | 45 |
| Pencil hardness | 3H | 3H | 3H | 3H | 3H | 3H | 3H | 4H | 4H | 4H |
| Solvent resistance, ethyl acetate, 30 min. | OK | " | " | " | " | " | " | " | " | " |
| Weather resistance, Weather-O-Meter, 300 hrs. | Good | " | " | " | " | " | " | " | " | " |
| Weather resistance, Gloss retention, % | 77 | 80 | 78 | 80 | 83 | 88 | 79 | 76 | 75 | 75 |

As is apparent from the results in Table 2, the novel resin composition for powder coatings obtained according to this invention exhibits excellent coating film characteristics, and hence, the present invention will greatly contribute to the technical progress of powder coatings.

Comparative example 1

For comparison, polyester resins containing dibasic acid, in which endomethylenetetrahydrophthalic acid is less than 10 % and more than 50 %, were prepared with the compositions shown in Table 3 in the same manner as shown in Example 1, respectively, and the properties of the resulting compositions were observed in the same manner as shown in Example 1.

Table 3

| Resin No. | Composition of charge | | | |
|---|---|---|---|---|
| | EMTPA | FA | TPA | EG |
| 12 | 0.2 | 0.8 | 1.25 | 2.5 |
| 13 | 1.0 | 0.4 | 0.5 | 1.1 |

Note:
EMTPA: Endomethylenetetrahydrophthalic acid
FA: Fumalic acid
TPA: Dimethyl terephthalate
EG: Ethylene glycol When a powder coating was prepared from resin No. 12 in the same manner as shown in Example 1 and the resulting resin coating was applied and heated at 200°C for 1 hour, the tackiness of the resulting film was still remained. In case of resin No. 13, the resulting film was colored in yellow when heated at even 180°C.

Comparative example 2

Polyester resins containing dibasic acid, in which bis-p,p'-carboxyphenoxyethane is less than 50 % and more than 78 %, were prepared, respectively, with the compositions shown in Table 4 in the same manner as shown in Example 1.

Table 4

| Resin No. | Composition of charge | | | | |
|---|---|---|---|---|---|
| | EMTPA | FA | BCEA | EG | PG |
| 14 | 1.0 | 1.0 | 1.0 | 2.2 | 1.1 |
| 15 | 0.4 | 0.4 | 3.5 | 2.5 | 2.2 |

Note:
BCEA: Bis-p,p'-carboxyphenoxyethane
PG: Propylene glycol

When a powder coating prepared from resin No. 14 was kept at 40°C, after only one day the powder coating was converted to blocks and thereafter it could not be used. When a powder coating prepared from resin No. 15 was applied and heated at 220°C, a film having a smooth surface could not be obtained.

Comparative example 3

Polyester resin (resin No. 16) was prepared from 0.5 mole of EMTPA, 0.5 mole of FA, 1.25 mole of TDA, 0.30 mole of EG and 2.20 mole of PG. A powder coating prepared from above resin was converted to blocks at 40°C for only 2 days and thereafter it could not be used.

What is claimed is:
1. A resin composition for powder coatings capable of exhibiting good hardenability on being heated, after application, in the air at 150°C to 220°C for 10 to 40 minutes, which composition consits essentially of a polyester component having a softening point of 40° to 180°C and a number-average molecular weight of 500 to 8,000, said polyester component being obtained from a dibasic acid mixture containing (1) 10 to 50 mole % of endomethylenetetrahydrophthalic acid and the remaining portion of the mixture being a dibasic acid selected from the group consisting of aromatic dibasic acids, unsaturated dibasic acids and aliphatic dibasic acids and (2) a glycol.

2. A composition according to claim 1, wherein the aromatic dibasic acid is terephthalic acid, isophthalic acid, phthalic anhydride, 1,5-naphthalenedicarboxylic acid, 2,6-naphthalenedicarboxylic acid, p,p'-diphenyldicarboxylic acid, p,p'-bis(carboxyphenoxy) ethane, p,p-methylenedibenzoic acid, or p,p'-ethylenedibenzoic acid.

3. A composition according to claim 1, wherein the unsaturated dibasic acid is maleic anhydride or fumaric acid.

4. A composition according to claim 1, wherein the aliphatic dibasic acid is succinic acid, adipic acid, or sebacic acid.

5. A composition according to claim 1, wherein the glycol is at least one member selected from the group consisting of ethylene glycol, propylene glycol, 1,4-butanediol, 1,4-cyclohexanediol, 1,4-cyclohexanedimethanol, hydrogenated 4,4'-dihydroxy diphenyl propane, 2,2-bis(4-hydroxy propoxy phenyl)-propane, 2,2-bis(4-hydroxy ethoxyphenyl) propane, and neopentylglycol.

6. A composition according to claim 1, wherein the polyester is obtained from endomethylenetetrahydrophthalic acid, terephthalic acid, fumaric acid, and ethylene glycol.

7. A composition according to claim 1, wherein the polyester component is obtained from endomethylenetetrahydrophthalic acid, terephthalic acid, and ethylene glycol.

8. A composition according to claim 1, wherein the polyester component is obtained from endomethylenetetrahydrophthalic acid, fumaric acid, and ethylene glycol.

9. A composition according to claim 1, wherein the polyester is obtaind from endomethylenetetrahydrophthalic acid, terephthalic acid, fumaric acid, ethylene glycol, and propylene glycol.

10. A composition according to claim 1, wherein the polyester component is obtained from endomethylenetetrahydrophthalic acid, terephthalic acid, ethylene glycol, and propylene glycol.

11. A composition according to claim 1, wherein the polyester component is obtained from endomethylenetetrahydrophthalic acid, fumaric acid, terephthalic acid, neopentylglycol, and ethylene glycol.

12. A composition according to claim 1, wherein the polyester component is obtained from endomethylenetetrahydrophthalic acid, terephthalic acid, ethylene glycol, and a 4,4'-dihydroxy diphenyl propane propylene glycol adduct.

13. A composition according to claim 1, wherein the polyester component is obtained from naphthalene-1,5-or -2,6-dicarboxylic acid, endometylenetetrahydrophthalic acid, ethylene glycol, and propylene glycol.

14. A composition according to claim 1, wherein the polyester component is obtained from endomethylenetetrahydrophthalic acid, bis-p,p'-carboxyphenoxyethane, ethylene glycol, and propylene glycol.

15. A composition according to claim 1, wherein the polyester component is obtained from endomethylenetetrahydrophthalic acid, p,p'-diphenylethanedicarboxylic acid, ethylene glycol, and hydrogenated 4,4'dihydroxy diphenyl propane.

16. A composition according to claim 1, wherein 50 to 78 mole-% of the dibasic acid component are an aromatic dibasic acid having the substituent groups on the aromatic nucleus at para positions to each other.

17. A composition according to claim 16, wherein 30 to 100 mole-% of the aromatic dibasic acid having the substituent groups on the aromatic nucleus at para positions to each other are bishydroxyethyl ester of said aromatic dibasic acid or a polymer of said ester having a polymerization degree not exceeding 20.

18. A composition according to claim 1, wherein molar ratio of the total dibasic acids to the glycols is 1.0 to 1.2.

19. A composition according to claim 1, comprising a polyester in which 50 to 78 mole-% of the dibasic acid component are an aromatic dibasic acid having the substituent groups on the aromatic nucleus at para positions to each other and 30 to 100 mole-% of said aromatic dibasic acids are bound to one another through ethylene diester linkages.

20. A resin composition for powder coatings capable of exhibiting good hardenability on being heated, after application, in the air at 150°C to 220°C for 10 to 40 minutes, which composition consists essentially of from 0.1 to 50% by weight of a pigment, from 0.01 to 5% by weight of an additive selected from the group consisting of flow agents, color stabilizers and fluorescent whitening agents and a polyester component having a softening point of 40° to 180°C and a number-average molecular weight of 500 to 8,000, said polyester component being obtained from a dibasic acid mixture containing (1) 10 to 50 mole % of endomethylenetetrahydrophthalic acid and the remaining portion of the mixture being a dibasic acid selected from the group consisting of aromatic dibasic acids, unsaturated dibasic acids and aliphatic dibasic acids and (2) a glycol.

21. A composition according to claim 1, wherein particle size of the composition is in such a range that the particles pass through a 100- to 300-mesh screen.

22. A composition according to claim 20, wherein mixing of the polyester, pigment, and additive is carried out by (A) dissolving the polyester in a solvent, dispersing the pigment and additive in the resulting solution, and drying the dispersion, or (B) adding the said dispersion in a poor solvent to precipitate the composition, or (C) milling the said three components in molten state to obtain a dispersed mass.

23. A resin composition for powder coatings capable of exhibiting good hardenability on being heated, after application, in the air at 150°C to 220°C for 10 to 40 minutes, which composition consists essentially of from 0.1 to 50% by weight of a pigment and a polyester component having a softening point of 40° to 180°C and a number-average molecular weight of 500 to 8,000, said polyester component being obtained from a dibasic acid mixture containing (1) 10 to 50 mole % of endomethylenetetrahydrophthalic acid and the remaining portion of the mixture being a dibasic acid selected from the group consisting of aromatic dibasic acids, unsaturated dibasic acids and aliphatic dibasic acids and (2) a glycol.

24. A resin composition for powder coatings capable of exhibiting good hardenability on being heated, after application, in the air at 150°C to 220°C for 10 to 40 minutes, which composition consists essentially of from 0.01 to 5% by weight of an additive selected from the group consisting of flow agents, color stabilizers and fluorescent whitening agents and a polyester component having a softening point of 40° to 180°C and a number-average molecular weight of 500 to 8,000, said polyester component being obtained from a dibasic acid mixture containing (1) 10 to 50 mole % of endomethylenetetrahydrophthalic acid and the remaining portion of the mixture being a dibasic acid selected from the group consisting of aromatic dibasic acids, unsaturated dibasic acids and aliphatic dibasic acids and (2) a glycol.

* * * * *